United States Patent
Baroudi et al.

(10) Patent No.: US 10,425,788 B2
(45) Date of Patent: Sep. 24, 2019

(54) EQUAL DISTANCE DIFFERENT MEMBERS NODE PLACEMENT METHOD AND SYSTEM

(71) Applicant: KING FAHD UNIVERSITY OF PETROLEUM AND MINERALS, Dhahran (SA)

(72) Inventors: Uthman Baroudi, Dhahran (SA); Abdullatif Albaseer, Dhahran (SA); Shokri Selim, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/892,143

(22) Filed: Feb. 8, 2018

(65) Prior Publication Data

US 2019/0246248 A1 Aug. 8, 2019

(51) Int. Cl.
*H04W 4/38* (2018.01)
*H04B 17/18* (2015.01)
*H04W 84/18* (2009.01)

(52) U.S. Cl.
CPC .............. *H04W 4/38* (2018.02); *H04B 17/18* (2015.01); *H04W 84/18* (2013.01)

(58) Field of Classification Search
CPC ......... H04W 4/38; H04W 84/18; H04B 17/18
See application file for complete search history.

(56) References Cited

U.S. PATENT DOCUMENTS 8,295,173 B2 * 10/2012 Larsson .................. H04L 45/00
370/231

2005/0111428 A1 * 5/2005 Orlik ...................... H04L 45/02
370/344

(Continued)

FOREIGN PATENT DOCUMENTS

| CN | 102098691 B | 6/2013 |
| CN | 103139862 A | 6/2013 |
| CN | 103945484 B | 6/2017 |

OTHER PUBLICATIONS

Banerjee, et al. "CCABC: Cyclic Cellular Automata Based Clustering for Energy Conservation in Sensor Networks", International Journal of Wireless & Mobile Networks (IJWMN) vol. 3, No. 4, Aug. 2011.

(Continued)

*Primary Examiner* — Curtis A Alia
(74) *Attorney, Agent, or Firm* — Oblon, McClelland, Maier & Neustadt, L.L.P.

(57) ABSTRACT

The present disclosure relates to a clustering approach for sensor nodes of a wireless sensor network. This clustering approach, equal distance different members, balances the power burden amongst sensor nodes by deriving an optimal number of sensor nodes at each segment of a length. To this end, the present disclosure describes a linear wireless sensor network wherein the distance between adjacent cluster heads is equal while the number of and distance between sensor nodes in each cluster is different. A power consumption model is derived to aid in the determination of the optimal number of sensor nodes within each cluster. Following evaluation of the cluster approach in comparison with previously described approaches, the present disclosure is observed to improve network longevity and reduce power consumption by deliberately increasing the density of sensor nodes nearest a base station.

20 Claims, 17 Drawing Sheets

(56) References Cited

U.S. PATENT DOCUMENTS

| | | | |
|---|---|---|---|
| 2006/0066455 A1* | 3/2006 | Hancock | H04Q 9/00 340/870.01 |
| 2015/0267924 A1* | 9/2015 | Trantham | G05D 23/1931 237/8 A |
| 2016/0323839 A1* | 11/2016 | Davis | H04W 56/0015 |

OTHER PUBLICATIONS

Padmanabhan, et al. "Energy Enhanced Base Station Controlled Dynamic Clustering Protocol for Wireless Sensor Networks", Advanced Communication Control and Computing Technologies (ICACCCT), 2012 IEEE International Conference on.

* cited by examiner

EQUAL DISTANCE DIFFERENT MEMBERS NODE PLACEMENT METHOD AND SYSTEM

STATEMENT REGARDING PRIOR DISCLOSURE BY THE INVENTORS

Aspects of this technology are described in U.S. patent application Ser. No. 15/716,100 "Node placement for pipeline monitoring", filed on Sep. 26, 2017, which is incorporated herein by reference in its entirety.

BACKGROUND

Field of the Disclosure

The present disclosure relates to placement of transmitting sensor nodes of a wireless sensor network (WSN). The sensor nodes are arranged mathematically for data fidelity and power consumption.

Description of the Related Art

Node clustering is a beneficial technique for applications that require a high scalability of tens to hundreds of sensor nodes, wherein the majority of energy consumption is disproportionately confined to sensor nodes closer to a base station. This approach is particularly beneficial for critical distribution networks, including pipelines for transport of water from reservoirs to distant population centers.

Several approaches have been developed to monitor network damage and ensure efficient operation of distribution networks. These approaches, however, are challenged by the linear, pre-determined topology of certain pipeline distribution networks.

In Banerjee et al., the authors propose a scheme for a pre-existing network of wireless sensors over a large geographic area. The scheme manages cluster size and density of a randomly arranged sensor network to minimize energy consumption. See Banerjee, I, Chanak, P, and Rahaman, H, "CCABC: Cyclic Cellular Automata Based Clustering For Energy Conservation in Sensor Networks", published in *International Journal of Wireless and Mobile Networks*, 2011.

Padmanabhan et al. investigated the use of real-time queries to balance energy consumption and maximize network life of a randomly arranged wireless sensor network. The reference used a modified energy enhanced dynamic clustering protocol for wireless sensor networks. See Padmanabhan, K, Kamalakkannan, P, "Energy enhanced base station controlled dynamic clustering protocol for wireless sensor networks", published in Journal of Advances in Computer Networks, 2013.

Node placement in WSNs has been widely investigated. And while thoughtful studies, such as the above, have investigated randomly oriented WSNs, few studies have been devoted to linearly deployed sensors in a WSN. Fewer still have adopted realistic power models not reliant on unidirectional transport of data packets. In order to maximize WSN lifetime in linear systems, a new model of sensor node placement and power consumption is required.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a clustering approach for transmitting sensor nodes of a wireless network. This clustering approach, equal distance different members (EDDM), balances the power burden amongst sensor nodes by deriving an optimal number of sensor nodes at each segment of a length. To this end, the present disclosure describes a linear wireless sensor network wherein the distance between adjacent clusters is equal while the number of and distance between sensor nodes in each cluster is different. A power consumption model is derived to determine the optimal number of sensor nodes within each cluster and, thus, power consumption.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

As used herein, scalability refers to the need for load balancing, efficient resource usage, and reliable data aggregation.

Figure 1:
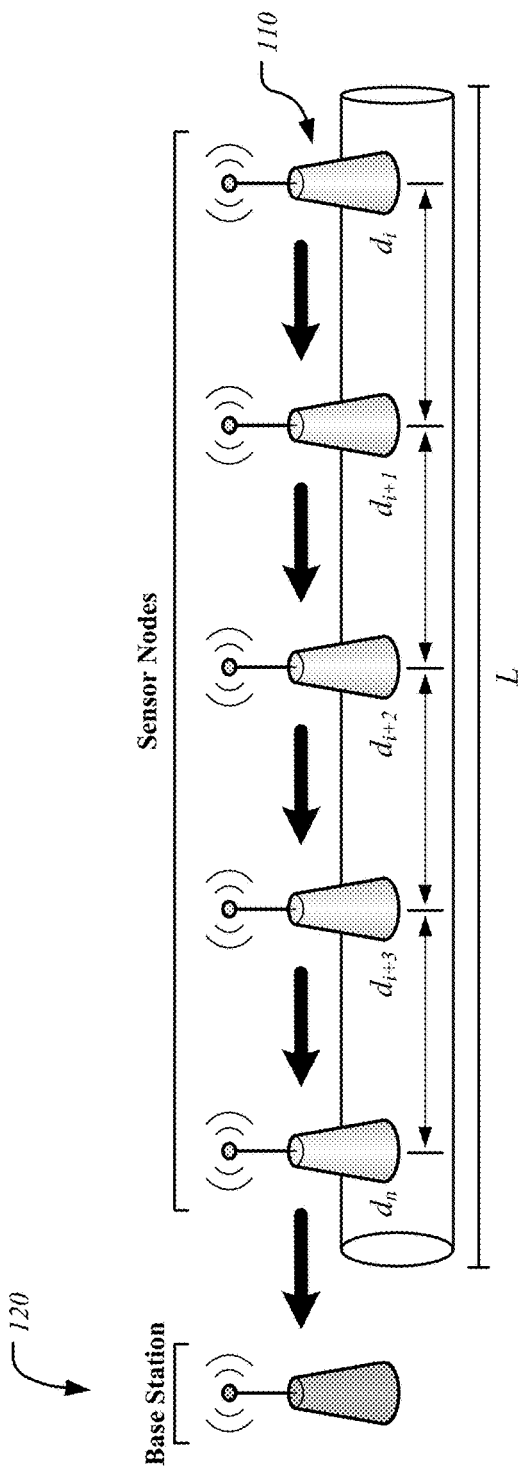
FIG. 1 is a schematic of a linear wireless sensor network (WSN) architecture.

FIG. 1 illustrates a generic wireless sensor network (WSN) architecture of multiple sensor nodes (SN) 110 placed on a pipe and is meant as a high-level introduction to linear WSN design. In an embodiment of the present disclosure, each SN 110 described in FIG. 1 would comprise a cluster of one or more SNs at pre-determined positions along the length of a pipe. Each SN 110 is configured to monitor physical and/or environmental conditions, such as temperature, sound, and pressure, and to cooperatively pass their data to an associated base station (BS) 120. In an exemplary embodiment of the present disclosure, the SNs 110 are employed on a pipeline for monitoring the integrity of the pipeline and detecting leaks with high accuracy. When the pipeline is transporting a limited resource, such as drinking water, to a distant population center, the ability to rapidly detect and respond to leaks is imperative. In the high-level approach of FIG. 1, SNs 110 are deployed at pre-determined positions along the length of the pipe. A distance d between each SN 110 is a function of a transmission power setting of the SN 110 and the manufacturer defined transmission range of the SN 110. Using a multi-hop forwarding scheme, SNs 110 relay transmissions between the SNs 110 and a BS 120. The BS 120 is positioned at one end of the pipe and is the distance d from the nearest SN 110. In a configuration typical of previous, linear WSNs, and addressed herein by the present disclosure, data to be forwarded to the BS 120 is carried by each SN 110 between $d_1$ and $d_a$, wherein the SNs 110 nearest to the BS 120 carry highly asymmetric transmission loads. Following transmission along the length of the pipe, the BS 120, in communication with a processing unit, determines the presence of damage to the pipe according to data in the received transmission.

In further reference to FIG. 1, L denotes the length of a pipe. n denotes the SNs along the pipe and i denotes a specific SN, where $1 \leq i \leq n$. m denotes the number of power levels (e.g. m=31 for TelosB, MicaZ), wherein each SN, responsible for data acquisition and reporting, has a transmission power $P_j$ and a communication range $R_j$, where j=1, 2, 3, ..., m. For example, and as eluded to above, to transmit the data at power level j, the required transmission power is defined as $P_j$. Any SN can be set to a different power level and therefore, any SN can communicate within different transmission ranges.

Figure 2:
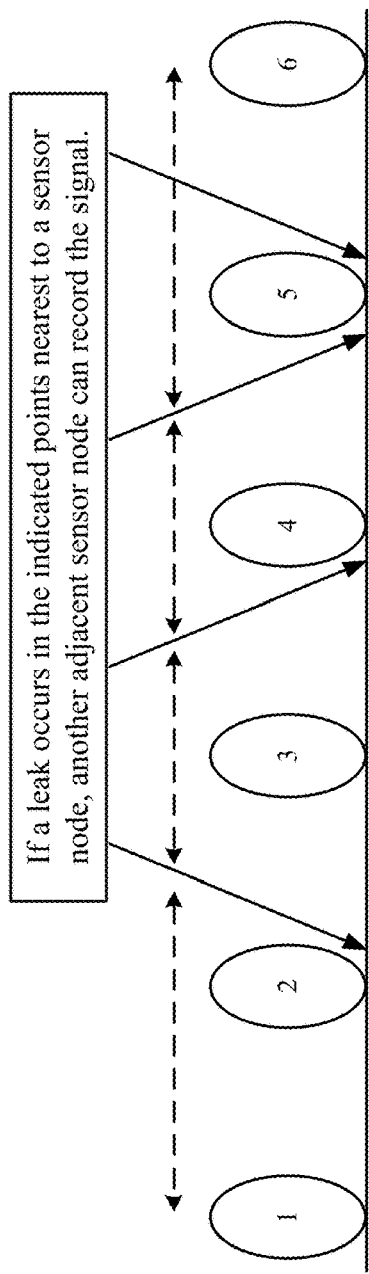
FIG. 2 is a schematic reflecting the relationship between node spacing and sensing fidelity of a damaged signal.

To ensure fidelity of transmission along the length of the WSN, the distance between SNs should not exceed the maximum transmission range of the SN employed (e.g. 95 meters for TelosB). In a simple model employing TelosB motes, where each segment contains only three SNs (equal distance equal members, or EDEM), the distance between adjacent SNs must be less than or equal to 32 meters. This ensures that pipe issues near a single SN will be detected by a regional SN within the WSN, pursuant to the total transmission range. FIG. 2 illustrates the level of fidelity needed to capture leak signals by more than one SN.

$$d_{fid} \leq \frac{R_{max}}{n_{min}}$$

where $d_{fid}$ is the optimal distance to ensure fidelity, $R_{max}$ is the maximum transmission range, and n is the minimum number of SNs to achieve this fidelity.

Fundamental to a system model of the embodiments described herein is a rotating cluster head (CH) strategy. As opposed to transmission where each SN transmits its own communication and the communication of its neighboring SN, a common strategy utilizes cluster heads to gather and transmit the communications of entire clusters, thus reducing the power burden on a subset of SNs in a WSN. Further, the present disclosure alternately selects SNs to serve as cluster head in order to reduce the total power consumption within the cluster and the entire WSN. Each SN is assigned to only one cluster $c_r$, where $1 \leq r \leq NCH$, where NCH is the number of clusters (NCH$\leq$n). Each SN can completely communicate with its CH, via single or multiple hops.

Figure 3A:
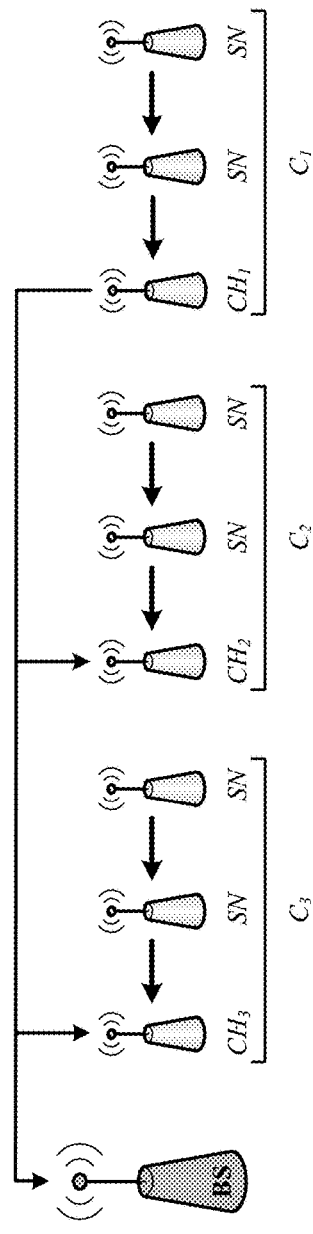
FIG. 3A is a schematic of the data forwarding process when each cluster contains an identical number of sensors.

FIG. 3A illustrates an exemplary arrangement of a WSN wherein three clusters each contain three SNs. Reflecting the EDEM approach (FIG. 2), a SN nearest a BS in each cluster is initially selected as the CH. Each SN within the cluster relays their communication to their respective CH, which relays the clustered transmission to an adjacent cluster, wherein the process is repeated. In FIG. 3A, $CH_1$ relays the transmission of $C_1$ to $CH_2$, which transmits the communication of $C_1$ and $C_2$ to $CH_3$, wherein a final data packet containing communications from all three clusters is transmitted to the BS. In this arrangement, and according to the assign power level of the SN, $CH_3$ experiences asymmetrically high loads and, in the absence of cluster head alternately, would limit WSN lifetime.

Figure 3B:
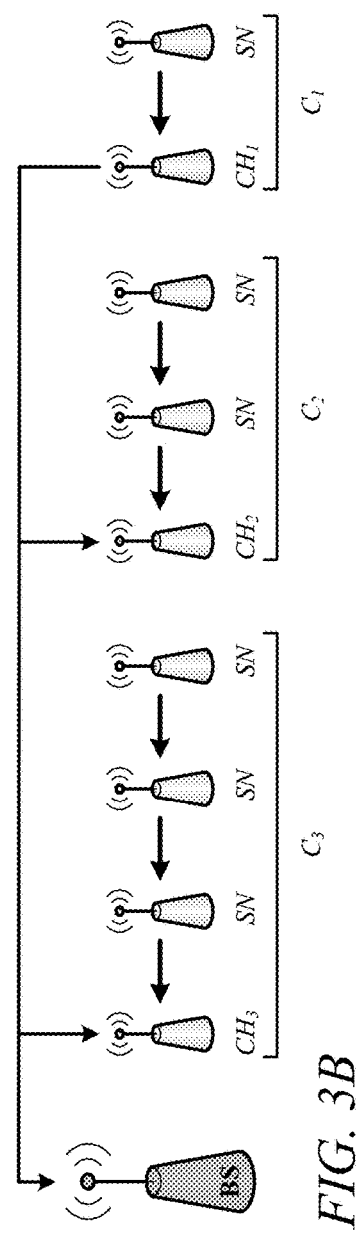
FIG. 3B is a schematic of the data forwarding process when each cluster contains a variable number of sensors.

FIG. 3B illustrates an exemplary embodiment of a WSN wherein three clusters contain varying numbers of SNs, reflecting the WSN described in the present disclosure. Employing the EDDM approach, clusters closer to the BS contain higher numbers of SNs in an effort to balance power consumption and the asymmetric data packet loads experienced close to the BS (as in FIG. 3A). In this embodiment, $C_3$ contains four SNs, while $C_2$ contains three SNs and $C_1$ two SNs, in accordance with anticipated data packet transmission loads (increased packets nearer the BS). Similar to FIG. 3A, each SN within a cluster relays their communication to their respective CH, which relays the clustered transmission to an adjacent cluster, wherein the process is repeated. $CH_1$ relays the transmission of $C_1$ to $CH_2$, which transmits the communication of $C_1$ and $C_2$ to $CH_3$, wherein a final data packet containing communications from all three clusters is transmitted to the BS. In the approaches of both FIG. 3A and FIG. 3B, and in order to extend the lifetime of the network, different SNs are selected as CHs at various time points according to power consumption in the WSN.

In determining the appropriate SN density in each cluster, as described in FIG. 3B, first, a mathematically-derived model of power consumption was developed. The total power consumption of each cluster is computed by calculating the power consumption of cluster members and the power consumption of the cluster head (CH). This can be modeled as $$P_{total} = \text{intra power consumption} + \text{inter cluster head power consumption}$$

where the intra power consumption is the energy consumed by the SNs inside the same cluster and the inter cluster head power consumption is the energy consumed by the CH of the cluster. Initially, the intra power consumption, when time t=1, can be expressed as:

$$EC_i = \sum_{i=1}^{k-1} i \cdot P_{t_i} + (i-1) \cdot P_R$$

where $EC_i$ is the energy consumed by the SNs in each cluster i, k is the total number of SNs in each cluster, $P_t$ is the transmission power for a single packet within a cluster, $P_R$ is the receiving power of one packet within a cluster, and t is the required time for transmitting or receiving a single packet. After assigning equal distances between the sensor nodes within each cluster $P_{ti} = P_T$, the following is derived:

$$EC_i = P_T \sum_{i=1}^{k-1} i + P_R \sum_{i=1}^{k-1} (i-1)$$

By converting the summation (above) of the inner power consumption to a fractional form, the formula can be modeled as:

$$EC_i = P_T \frac{k(k-1)}{2} + P_R \frac{(k-2)(k-1)}{2} \quad (1.1)$$

Further, the power consumption of the CH is defined as:

$$ECH_i = i \cdot k_i \cdot P_C \cdot t + (i \cdot k_i - 1) \cdot P_R \cdot t$$

where $ECH_i$ is the inter CH power consumption, $P_C$ is the transmission power for a single packet from a CH, $P_R$ is the receiving power of a single packet from a CH, and $K_i$ denotes the number of SNs in each cluster i. For simplicity, $ECH_i$ is further defined as f, thus the total energy consumption of the cluster i can be expressed as:

$$E_i = EC_i + f_i \quad (1.2)$$

Because each cluster may contain a different number of SNs, network lifetime ($LT_i$) can be expressed as:

$$LT_i = \frac{k_i \cdot E_{budget}}{E_i}$$

where $E_{budget}$ is the initial capacity of the sensor node battery and $E_i$ is the total energy consumption of the cluster i. By substituting $E_i$ into (1.2), $LT_i$ can be expressed as:

$$LT_i = \frac{k_i \cdot E_{budget}}{P_T \frac{k(k-1)}{2} + P_R \frac{(k-2)(k-1)}{2} + f_i}$$

As a result, the final formula of the lifetime calculation can be simplified to:

$$LT_i = \frac{2 \cdot k_i \cdot E_{budget}}{P_T \cdot k(k-1) + P_R \cdot (k-1)(k-2) + 2f_i} \quad (1.3)$$

Next, the optimum number of k SNs in each cluster must be determined to maximize WSN lifetime, derived in (1.3). For the optimal K* SNs, the following convex is expected:

$$LT_{i-1}(K^*-1) < LT_i(K^*) < LT_{i+1}(K^*+1)$$

From (1.3), the lifetime of K* can be expressed as:

$$LT_i(k^*) = \frac{2k^* E_{budget}}{P_T k(k^*-1) + P_R(k^*-1)(k^*-2) + 2f_i}$$

Likewise, the lifetime of K*+1 can be expressed as:

$$LT_{i+1}(k^*+1) = \frac{2(k^*+1)E_{budget}}{P_T k(k^*-1+1) + P_R(k^*-1+1)(k^*-2+1) + 2f_i} = \frac{2(k^*+1)E_{budget}}{P_T k(k^*) + P_R(k^*)(k^*-1) + 2f_i}$$

Therefore, the following condition must be satisfied:

$$\frac{2k^* E_{budget}}{P_T k(k^*-1) + P_R(k^*-1)(k^*-2) + 2f_i} > \frac{2(k^*+1)E_{budget}}{P_T k(k^*) + P_R(k^*)(k^*-1) + 2f_i}$$

The inequality can be solved as quadratic equations, wherein one side of the inequality is solved as:

$$k^* \geq \frac{-(P_T + P_R) + \sqrt{(P_T + P_R)^2 + 8(P_R + f)(P_T + P_R)}}{2(P_T + P_R)}$$

which can be further simplified to:

$$k^* \geq \sqrt{\frac{1}{4} + \frac{2(P_R + f)}{(P_T + P_R)}} - \frac{1}{2} \quad (1.4)$$

and by applying the same process to the other side of the inequality, the result is expressed as:

$$k^* \leq \sqrt{\frac{1}{4} + \frac{2(P_R + f)}{(P_T + P_R)}} + \frac{1}{2} \quad (1.5)$$

The variability in the determinacy of the above k* values indicates that the optimal number of SNs in each cluster is bounded between the values resulting from (1.4) and (1.5).

$$\sqrt{\frac{1}{4} + \frac{2(P_R + f)}{(P_T + P_R)}} + \frac{1}{2} \leq k^* \leq \sqrt{\frac{1}{4} + \frac{(P_R + f)}{(P_T + P_R)}} + \frac{1}{2}$$

Figure 4:
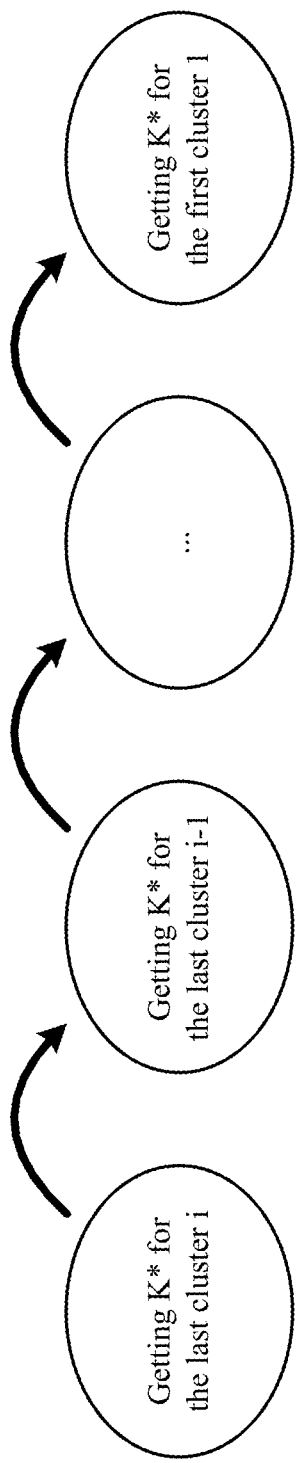
FIG. 4 is a schematic of the approach employed by EDDM to determine the optimal number of sensors in each cluster.

Next, the power consumption model described above is employed in a heuristic scheme. Fundamentally, for each cluster ($C_i$, $C_j$), wherein $C_j$ is furthest from the BS and i>j, the number of SNs in $C_i$ is greater than the number of SNs in $C_j$ ($NMC_i$>$NMC_j$). The EDDM heuristic scheme follows as:

1 Input: L, and ($P_j$, Rj) with j=m; //m=31
2 Start set optimal k=3, Fidelity$_{levels}$=8 //to achieve minimum fidelity
3 calculate number of clusters $$NC = \frac{L}{R_m} //$$

the number of clusters
4 For each cluster $C_i$, i=1, 2, ..., NC
5 set $M_i$=k //number of members
6 For each power level $P_{no}$ where no=1, 2, 3, ..., Fidelity$_{levels}$
7 If the number of members in this level can cover the cluster length//to select the exact distance which come up with the elected power level
8 Set the power level of these members to this level; break;
9 end if
10 end for
11 Calculate the expected lifetime of each cluster.
12 end for
13 For each cluster, $C_i$ where i=NC, NC−1, NC−1, ..., 1;
14 Start set k as an optimal members;
15 For all possible number of members start from K*=k+1;
16 For each power level $P_{no}$ where no=1, 2, 3, ..., Fidelity$_{levels}$
17 If the number of members in this level can cover the cluster length
18 Set the power level of these members to this level; break;
19 end if
20 end for
21 Calculate the lifetime of the cluster $C_i$ with K* members;
22 If the lifetime of $C_i$ with K* members>lifetime with k members;
23 i=K*; set k as an optimal;
24 end if
25 end for FIG. 4 broadly describes the above heuristic scheme. Initially, equal numbers of SNs are assigned in each cluster. The density of SNs in each cluster is then determined, beginning with the cluster furthest from the BS. To this end, the number of SNs that achieve maximum lifetime is iteratively calculated to ensure that all clusters have the proper number of SNs.

Following development of the above mathematical model and algorithm for SN placement, extensive simulation experiments were performed to evaluate the present disclosure (EDDM) in the context of previously developed approaches (EDEM). MATLAB was used to simulate the performance of these networks in a variety of scenarios, including at pipe lengths ranging from 950 meters to 4,750 meters. The same total number of SNs was deployed in both approaches. In evaluating the performance of these approaches, network lifetime, total power consumption, and total sent and forwarded packets were used as metrics.

Figure 5:
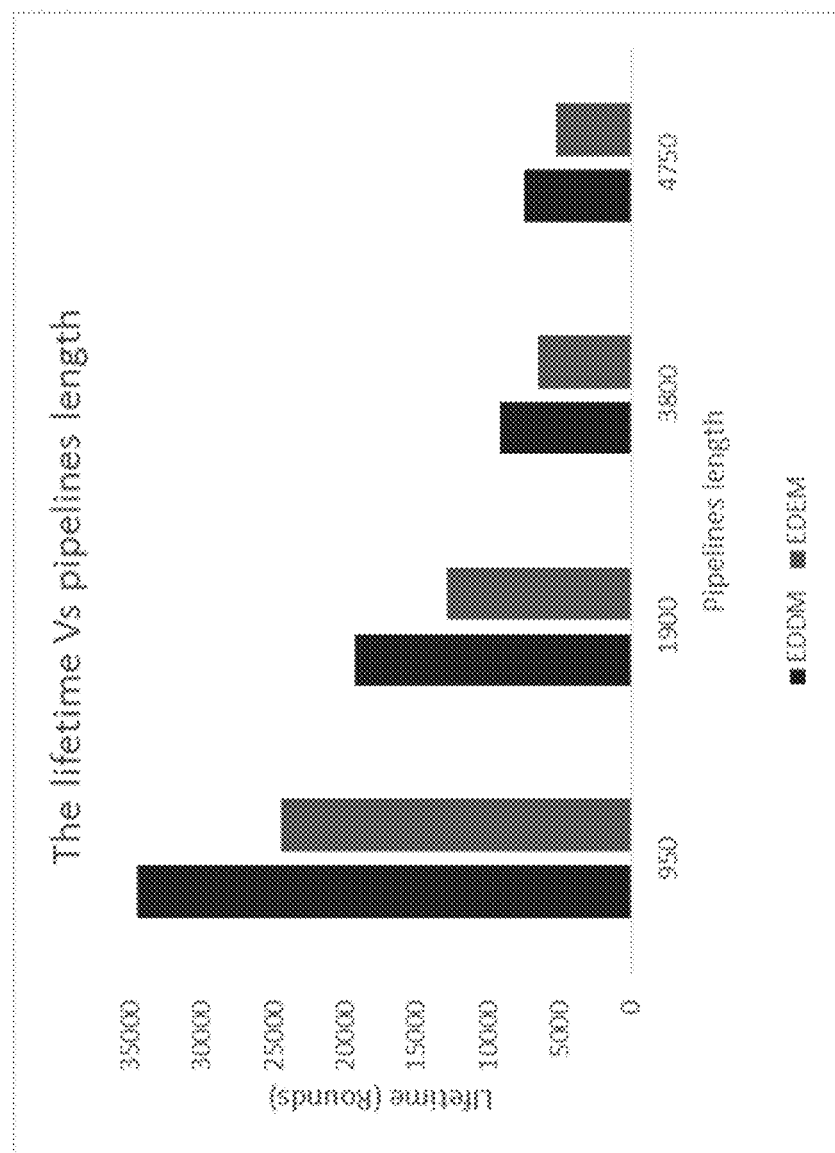
FIG. 5 is a graphical representation of a simulation of the lifetime of the WSN when comparing EDDM with equal distance equal members (EDEM) at varying pipeline lengths.

FIG. 5 evaluates the network lifetime of each approach at varying pipeline lengths from 950 meters to 4,750 meters. It is observed that the EDDM approach prolongs network life by 40% in all tested scenarios. This is likely due to collaboration of SNs in the cluster nearest the BS, as the density of SNs is highest, leading to improved sharing of network loads over time. In both approaches, however, lifetime decreases as pipe length increases, a function of transmission power available to each SN.

Figure 6:
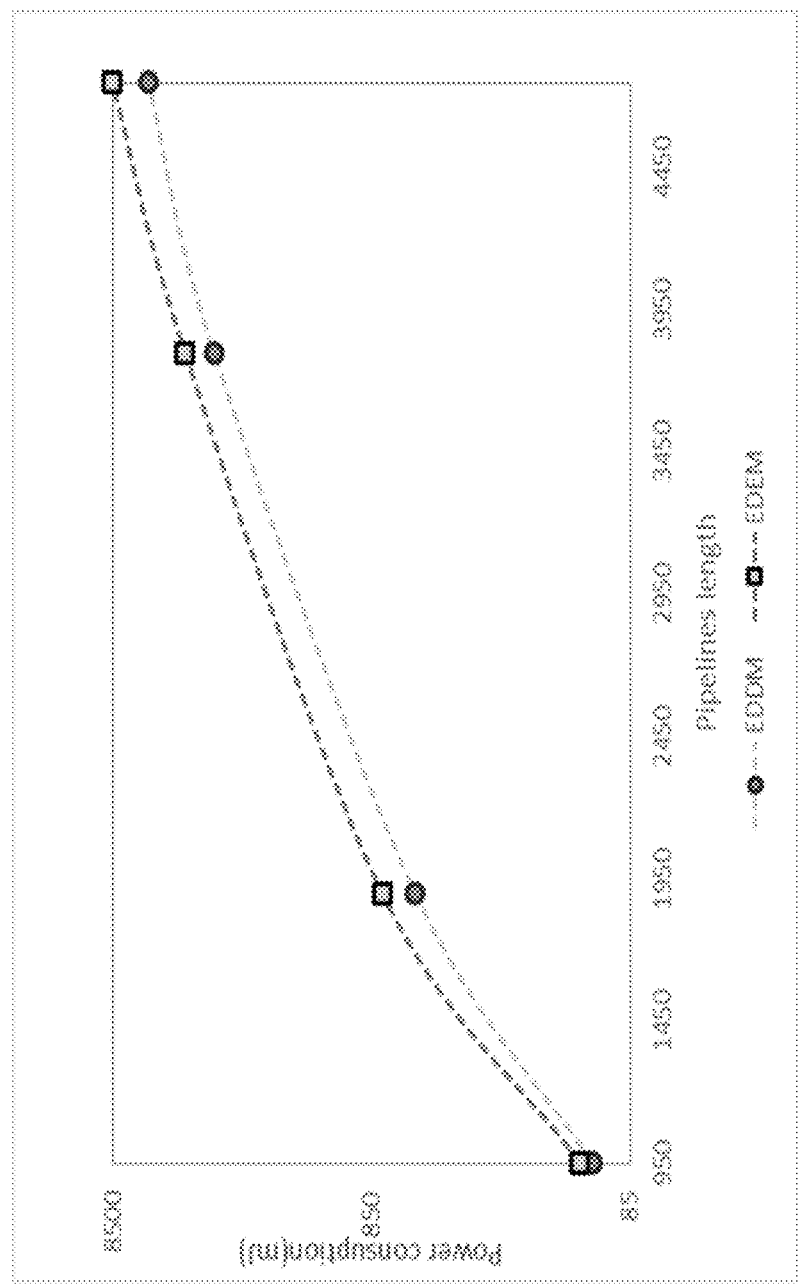
FIG. 6 is a graphical representation of a simulation of the power consumption of the WSN when comparing EDDM with EDEM at varying pipeline lengths.

FIG. 6 presents the total energy consumption of each network in all tested scenarios. The EDDM approach conserves 35% more power compared with EDEM, likely the result of a decrease in the total number of forwarded packets sent by the SNs of the cluster closest to the BS.

Figure 7:
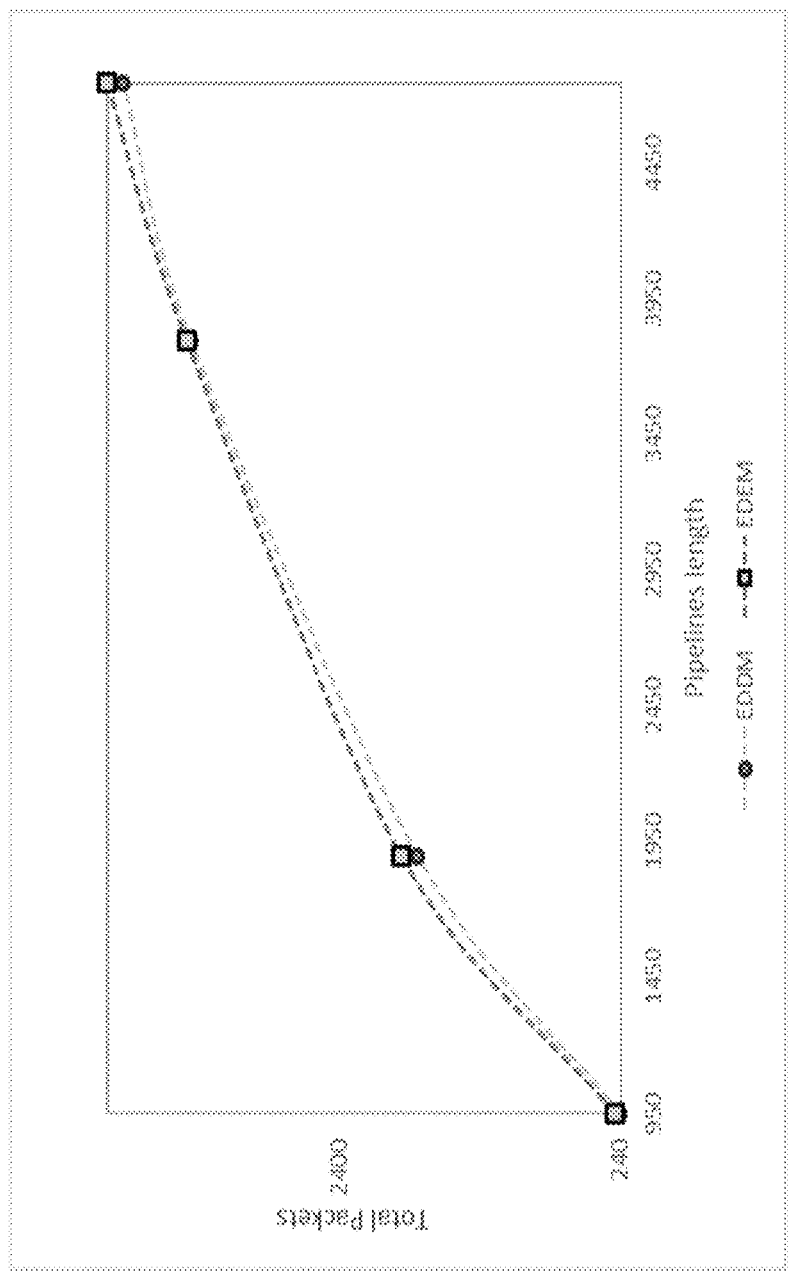
FIG. 7 is a graphical representation of a simulation of the total number of packets transmitted and forward when comparing EDDM with EDEM at varying pipeline lengths.

FIG. 7 illustrates the total number of sent and forwarded packets as a function of pipe length. Noticeably, the EDDM approach reduces the total packets forwarded by ~13%. This is due to optimally placed SNs, wherein clusters furthest from the BS, and with the least traffic, transmit fewer packets.

In addition to MATLAB simulations, several field experiments were conducted to demonstrate the applicability of the present disclosure. To this end, each approach (EDDM and EDEM) was deployed with hardware devices in an outdoor environment. For the EDEM approach, four members were assigned to each cluster. TelosB motes were deployed for field experiments with both approaches. Following preliminary testing, experimental parameters were defined as follows:

| Parameter | Value |
| --- | --- |
| ContikiOs | 2.7 |
| The pipelines length for both approaches | 950 meters |

-continued

| Parameter | Value |
|---|---|
| Tx current consumption | 8.5-17.4 mA |
| Rx current consumption | 18.8 mA |
| CPU current consumption | 1.8 mA |
| LPM current consumption | 5.1 uA |
| Voltage | 3 V |
| Nominal capacity | 2600 mAh |

In these experiments, the SN sends a measurement periodically to the BS. The operating code has been uploaded using contiki operating system, as it introduces a power-saving duty cycling protocol on the MAC layer and moves it to a new layer above the MAC layer called the Radio Duty Cycling layer. If a device is running ContikiMAC over normal 802.15.4 MAC layer, it will periodically activate the RF radio and check if the listening channel is busy. If there are packets in the channel, the radio will be kept on until it receives the packet and quickly returns to sleep. On the other hand, the sending node will also re-transmit the packet several times before it receives the response from the target.

In regard to node deployment, a total of 46 SNs were used in the field experiments. One of the SNs acts as the BS and is in communication with a laptop. The remaining 45 SNs are deployed in the outdoor environment in order to cover the intended distance. For the EDEM approach, the SNs are positioned according to assigned power level (31 for CHs, 4 for remaining SNs). For the EDDM approach of the present disclosure, the SNs are deployed based on the assigned power level in each cluster as computed by (1.1). SN deployment is characterized below, where a high Cluster ID number is correlated with a cluster closer to the BS.

| Cluster ID | 1 | 2 | 3 | 4 | 5 | 6 | 7 | 8 | 9 | 10 |
|---|---|---|---|---|---|---|---|---|---|---|
| # of SNs | 3 | 3 | 3 | 3 | 3 | 3 | 5 | 6 | 7 | 9 |
| Assigned Power Level | 8 | 6 | 6 | 6 | 6 | 6 | 5 | 5 | 5 | 5 |

The primary objective of the field experiments was to determine the optimal approach to conserve total energy consumption and increase battery lifetime of embedded devices in the field. For that reason, and because it carries the heaviest load (thus determining lifetime) the cluster of each WSN (Cluster ID=1) closest to the BS is the focus of the results presented herein.

Figure 8:
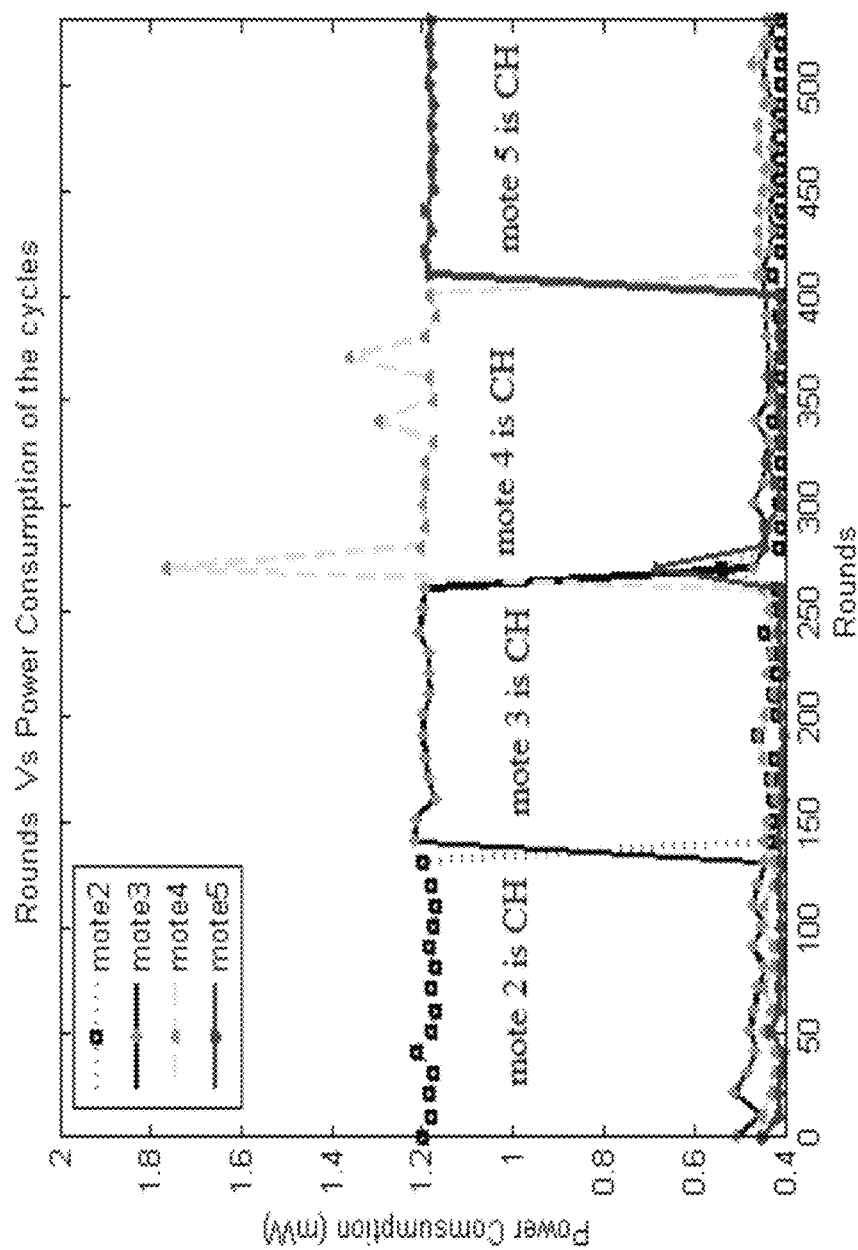
FIG. 8 is a graphical representation of power consumption of the sensors (motes) in the cluster closest to the base station as a function of cycles (rounds), according to the EDEM approach in a field experiment.

FIG. 8 is a graphical representation of the total power consumption of SNs 2-5 (cluster closest to the BS) as a function of time, according to the EDEM approach. It is seen that each SN, while serving as CH, exhibits equivalent power consumption. In contrast to the number of SNs in the EDEM approach, the number of SNs in the same cluster in the EDDM approach is nine, as the EDDM approach increases the density of SNs closer to the BS.

Figure 9:
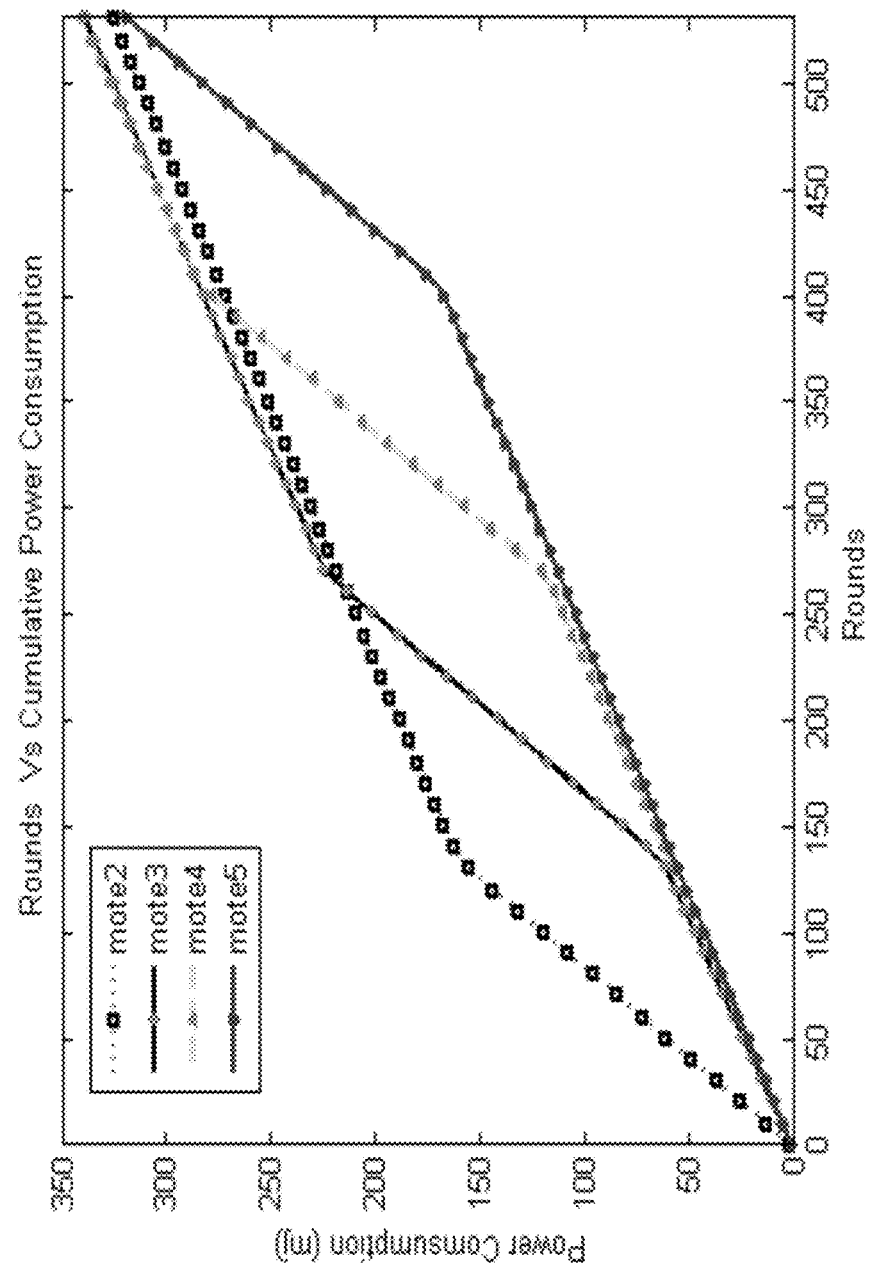
FIG. 9 is a graphical representation of the cumulative power consumption of the sensors (motes) in the cluster closest to the base station as a function of cycles (rounds), according to the EDEM approach in a field experiment.

FIG. 9 is a graphical representation of the cumulative power consumption of SNs 2-5 as a function of time, according to the EDEM approach. As each plot appears to converge to a point, it is observed that the power consumption of these SNs is balanced by the end of the experiment, as CH switching allows for distribution of packet loads over time.

Figure 10:
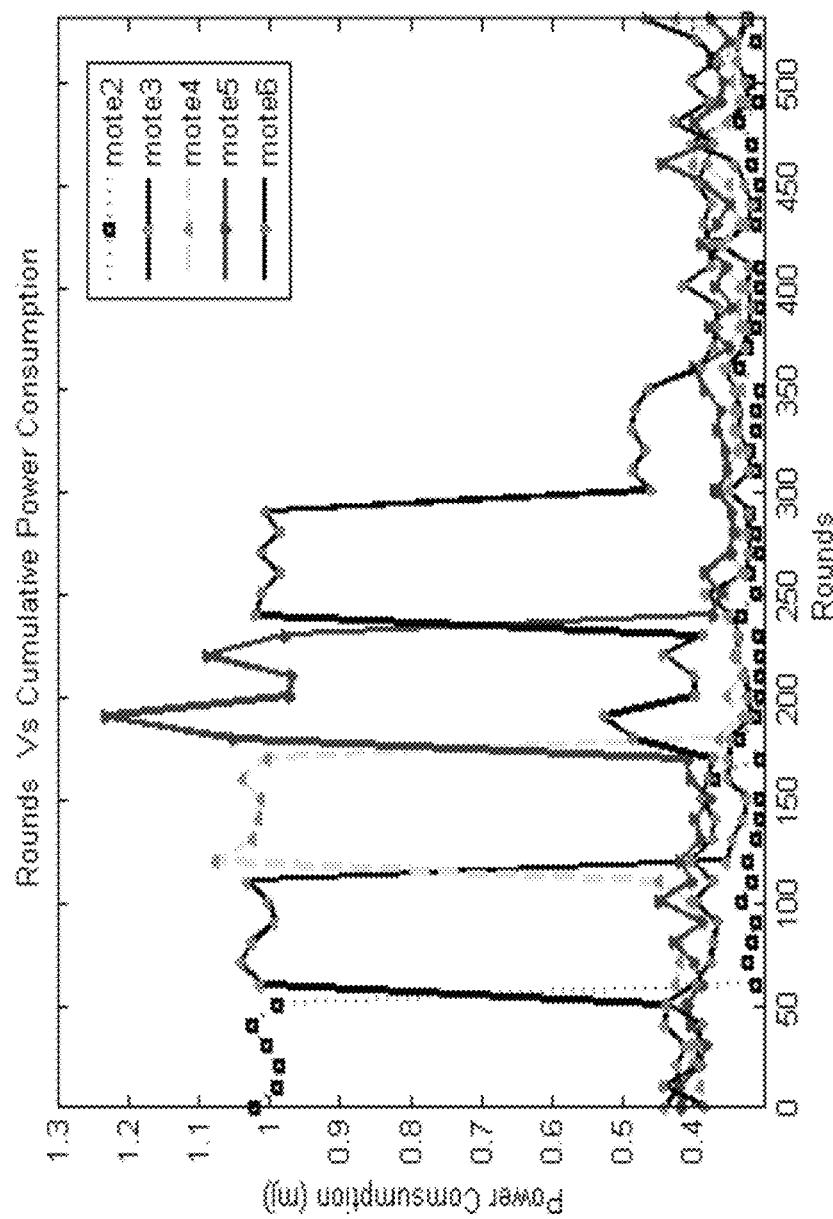
FIG. 10 is a graphical representation of power consumption of a portion of the sensors (motes) in the cluster closest to the base station as a function of cycles (rounds), according to the EDDM approach of the present disclosure in a field experiment.
Figure 11:
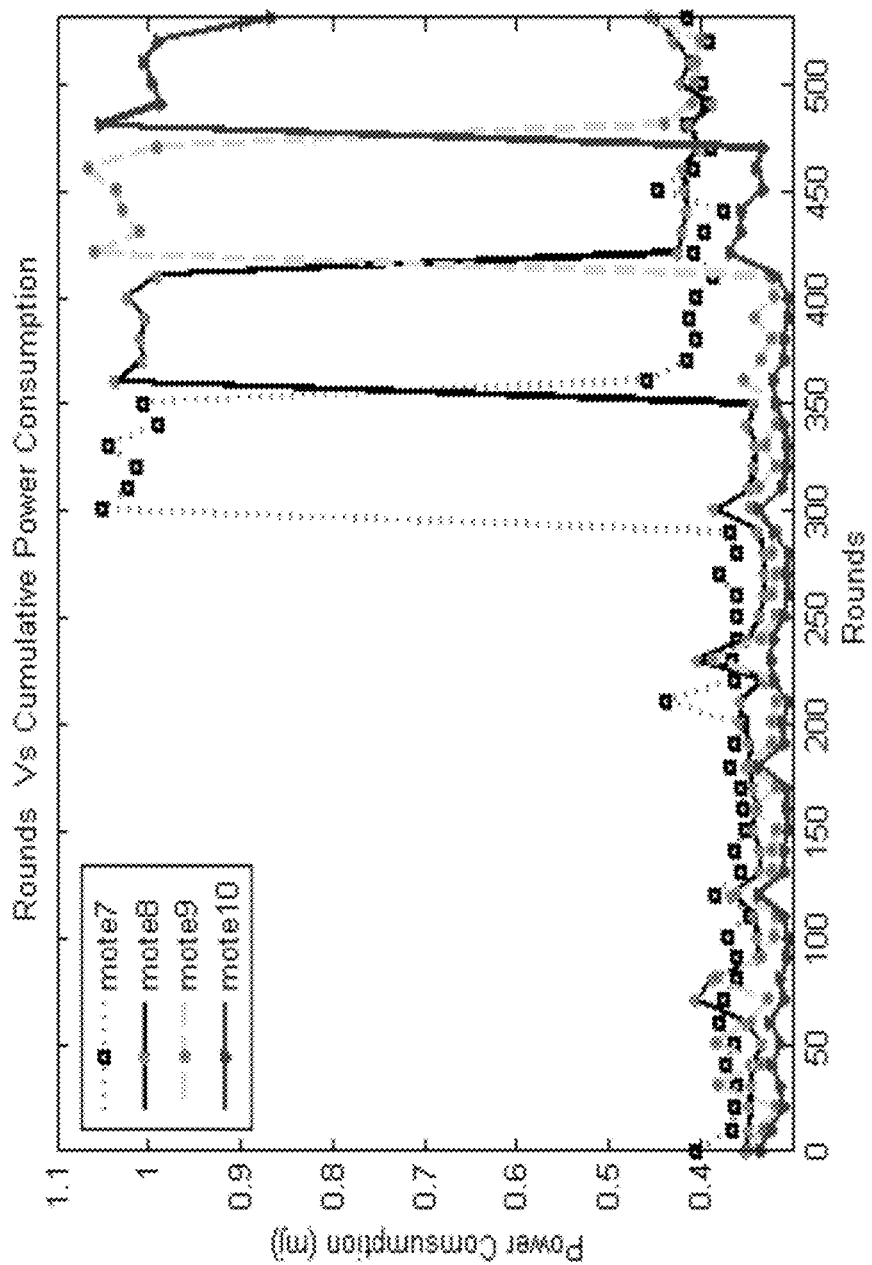
FIG. 11 is a graphical representation of power consumption of a portion of the sensors (motes) in the cluster closest to the base station as a function of cycles (rounds), according to the EDDM approach of the present disclosure in a field experiment.

FIG. 10 and FIG. 11 are graphical representations of the total power consumption of SNs 2-10 (cluster closest to the BS) as a function of time, according to the EDDM approach of the present disclosure. Compared to the EDEM approach, the EDDM approach conserves 35% more power, as can be observed by the reduction in peak power consumption in each SN, a result of the increased density of SNs closer to the BS.

Figure 12:
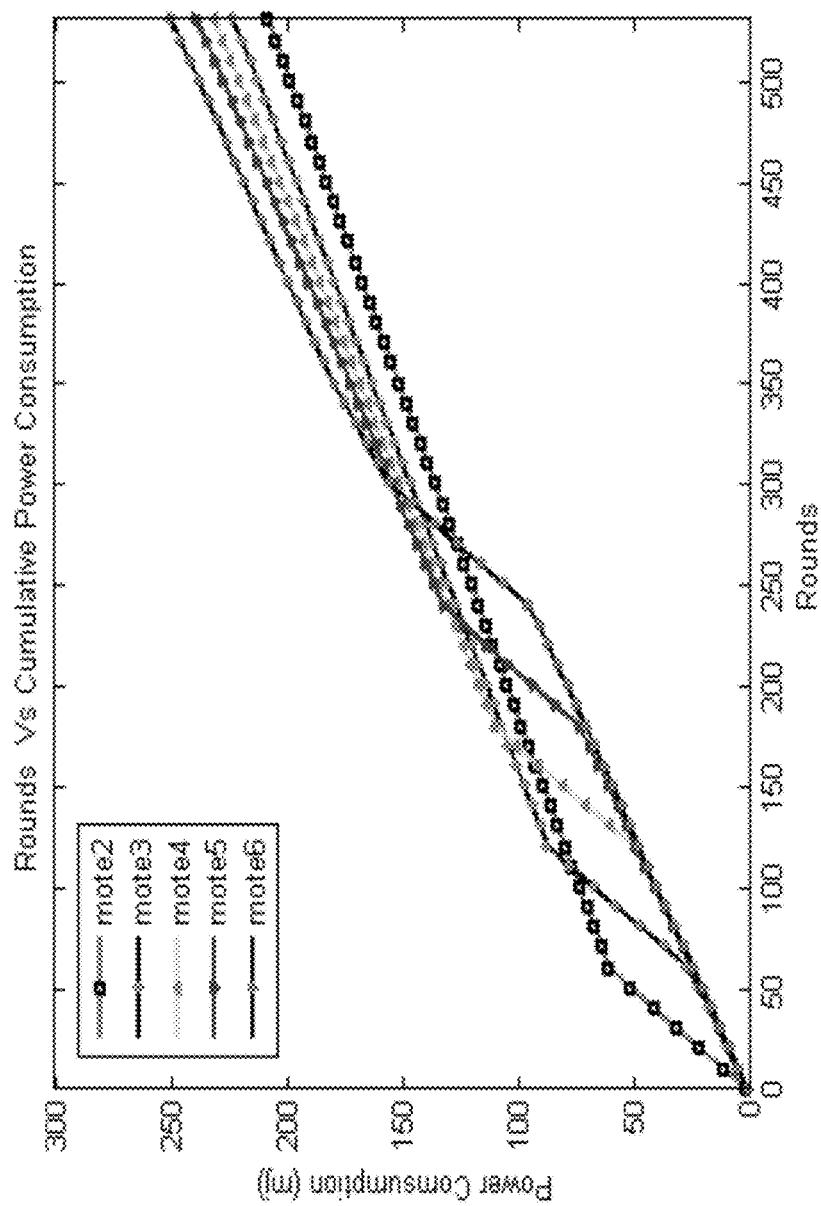
FIG. 12 is a graphical representation of the cumulative power consumption of a portion of the sensors (motes) in the cluster closest to the base station as a function of cycles (rounds), according to the EDDM approach of the present disclosure in a field experiment.
Figure 13:
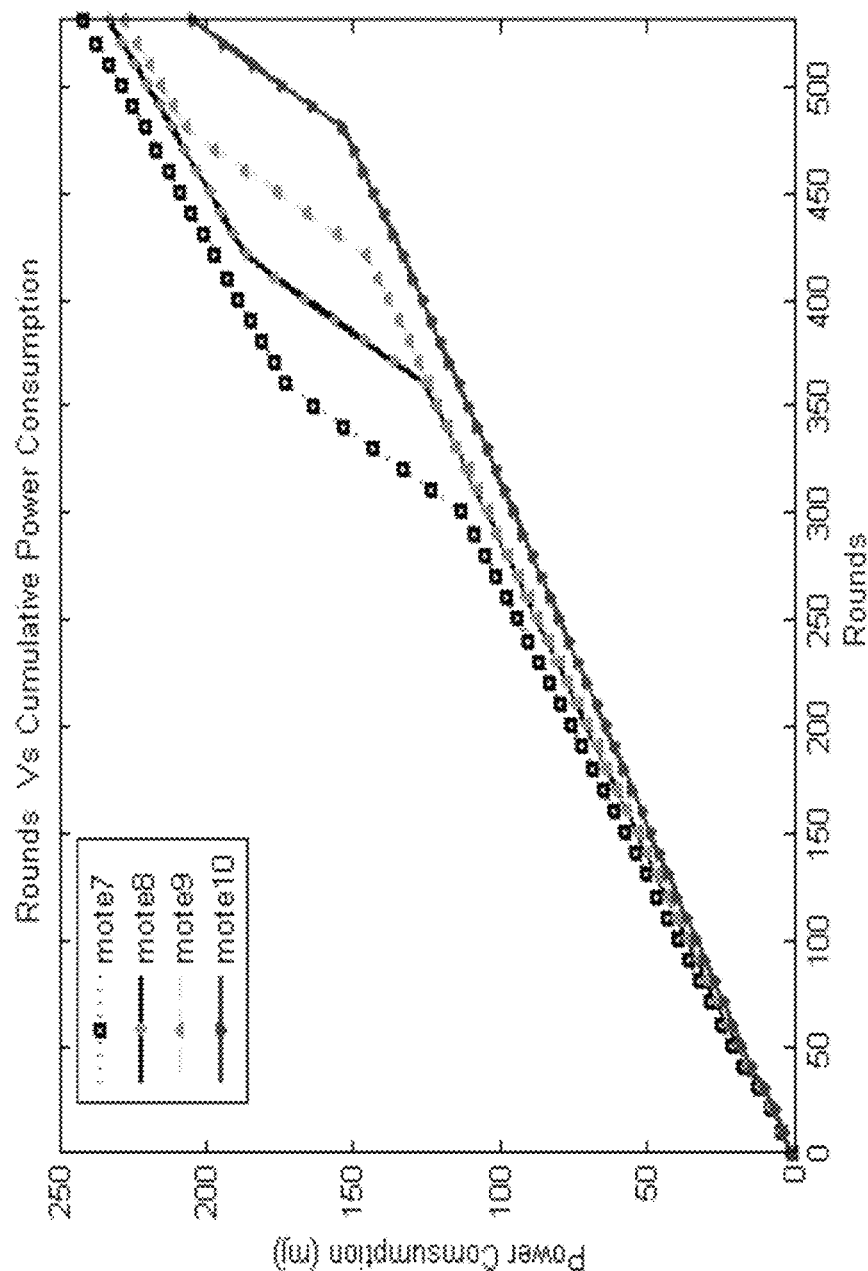
FIG. 13 is a graphical representation of the cumulative power consumption of a portion of the sensors (motes) in the cluster closest to the base station as a function of cycles (rounds), according to the EDDM approach of the present disclosure in a field experiment.

FIG. 12 and FIG. 13 are graphical representations of the cumulative power consumption of SNs 2-10 as a function of time, according to the EDDM approach of the present disclosure. It can be observed that the total power consumption converges as a result of data packet balancing amongst cluster members. Compared to the cumulative power consumption in the EDEM approach, power savings are seen in all sensors over time.

Figure 14:
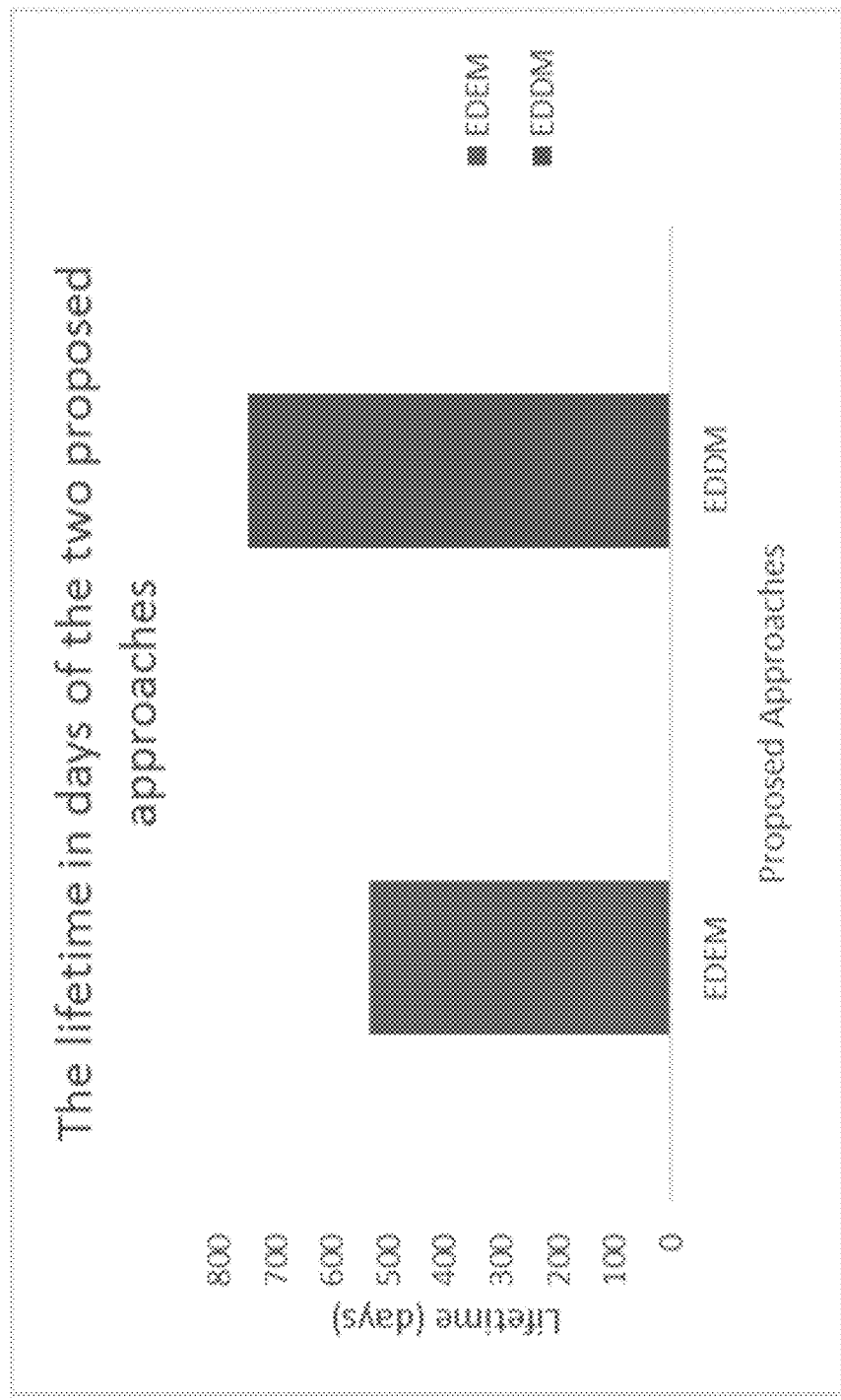
FIG. 14 is a graphical representation of the lifetime of the WSN when comparing EDDM with EDEM at a specific pipeline length in a field experiment.

FIG. 14 is a summary graphical representation of the lifetime of the EDEM and EDDM approaches. In FIG. 14, it is observable that the EDDM approach of the present disclosure prolongs WSN lifetime significantly. By distributing data packet loads amongst a larger number of SNs nearest the BS, the EDDM approach can improve WSN lifetime by 36% compared to the EDEM approach.

Figure 15:
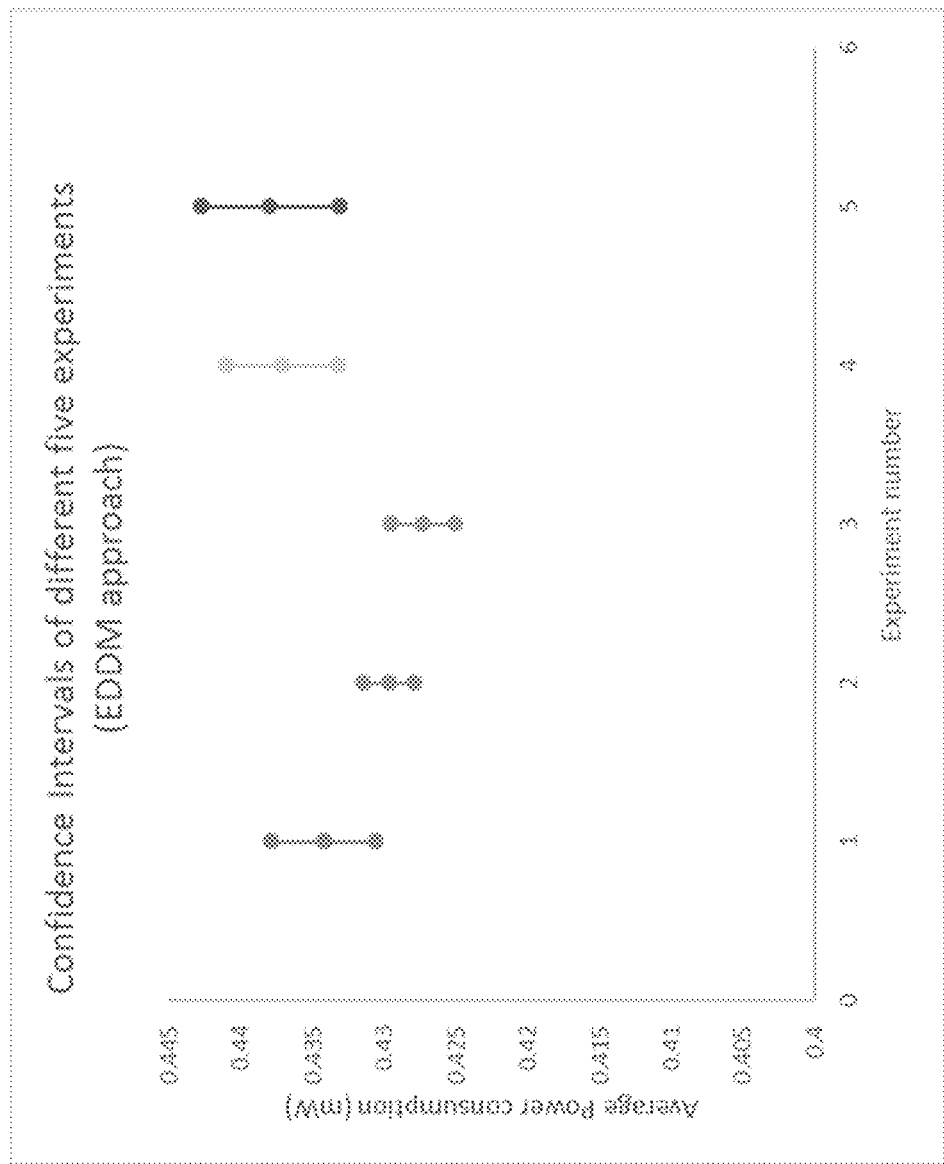
FIG. 15 is a graphical representation of the confidence intervals of power consumption of the five field experiments completed using the EDDM approach.

To verify results, FIG. 15 is a graphical representation of the confidence intervals of five duplications of the field experiments of the EDDM approach. The mean average power consumption of each experiment is presented with 95% confidence intervals and demonstrates repeatable performance of the WSN.

Figure 16:
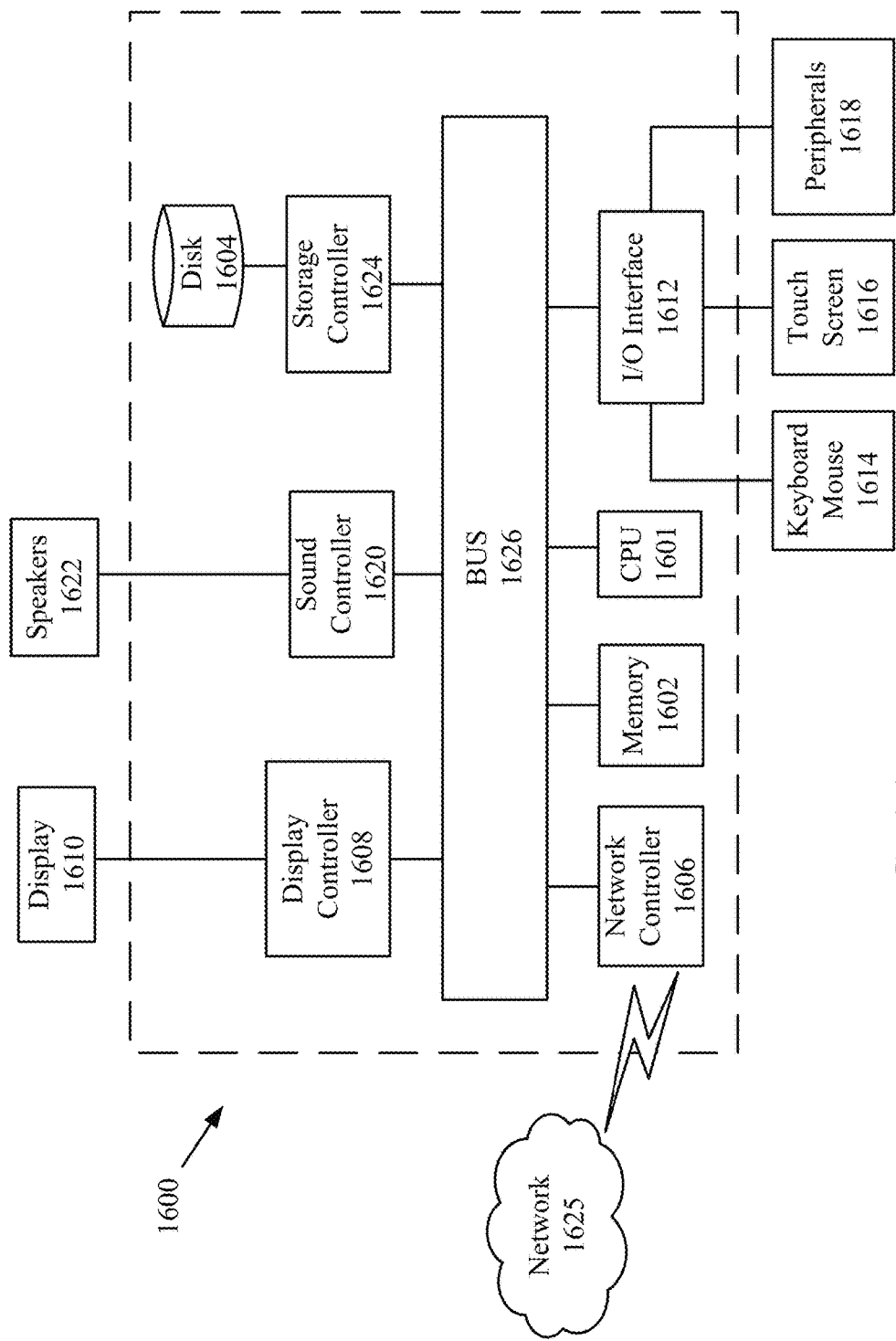
FIG. 16 is a block diagram of a hardware description of a computer in communication with the WSN.

FIG. 16 is a block diagram of a hardware description of a computer 1600 used in exemplary embodiments of the present disclosure. In the embodiments, computer 1600 can be a desktop, laptop, or server and is in communication with the base station of the WSN.

In FIG. 16, the computer 1600 includes a CPU 1601 which performs the processes described herein. The process data and instructions may be stored in memory 1602. These processes and instructions may also be stored on a storage medium disk 1604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 1600 communicates, such as a server or computer.

Further, the claimed advancements may be provided as a utility application, background daemon, or component of an operating system, or combination thereof, executing in conjunction with CPU 1601 and an operating system such as Microsoft® Windows®, UNIX®, Oracle® Solaris, LINUX®, Apple macOS® and other systems known to those skilled in the art.

In order to achieve the computer 1600, the hardware elements may be realized by various circuitry elements, known to those skilled in the art. For example, CPU 1601 may be a Xenon® or Core® processor from Intel Corporation of America or an Opteron® processor from AMD of America, or may be other processor types that would be recognized by one of ordinary skill in the art. Alternatively, the CPU 1601 may be implemented on an FPGA, ASIC, PLD or using discrete logic circuits, as one of ordinary skill in the art would recognize. Further, CPU 1601 may be implemented as multiple processors cooperatively working in parallel to perform the instructions of the inventive processes described above.

The computer 1600 in FIG. 16 also includes a network controller 1606, such as an Intel Ethernet PRO network interface card from Intel Corporation of America, for interfacing with network 1625. As can be appreciated, the network 1625 can be a public network, such as the Internet, or a private network such as LAN or WAN network, or any combination thereof and can also include PSTN or ISDN sub-networks. The network 1625 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 1600 further includes a display controller 1608, such as a NVIDIA® GeForce® GTX or Quadro® graphics adaptor from NVIDIA Corporation of America for interfacing with display 1610, such as a Hewlett Packard® HPL2445w LCD monitor. A general purpose I/O interface 1612 interfaces with a keyboard and/or mouse 1614 as well as an optional touch screen panel 1616 on or separate from display 1610. General purpose I/O interface 1612 also connects to a variety of peripherals 1618 including printers and scanners, such as an OfficeJet® or DeskJet® from Hewlett Packard.

A sound controller 1620 is also provided in the computer 1600, such as Sound Blaster X-Fi Titanium from Creative, to interface with speakers/microphone 1622 thereby providing sounds and/or music.

The general purpose storage controller 1624 connects the storage medium disk 1604 with communication bus 1626, which may be an ISA, EISA, VESA, PCI, or similar, for interconnecting all of the components of the computer 1600. A description of the general features and functionality of the display 1610, keyboard and/or mouse 1614, as well as the display controller 1608, storage controller 1624, network controller 1606, and general purpose I/O interface 1612 is omitted herein for brevity as these features are known.

Figure 17:
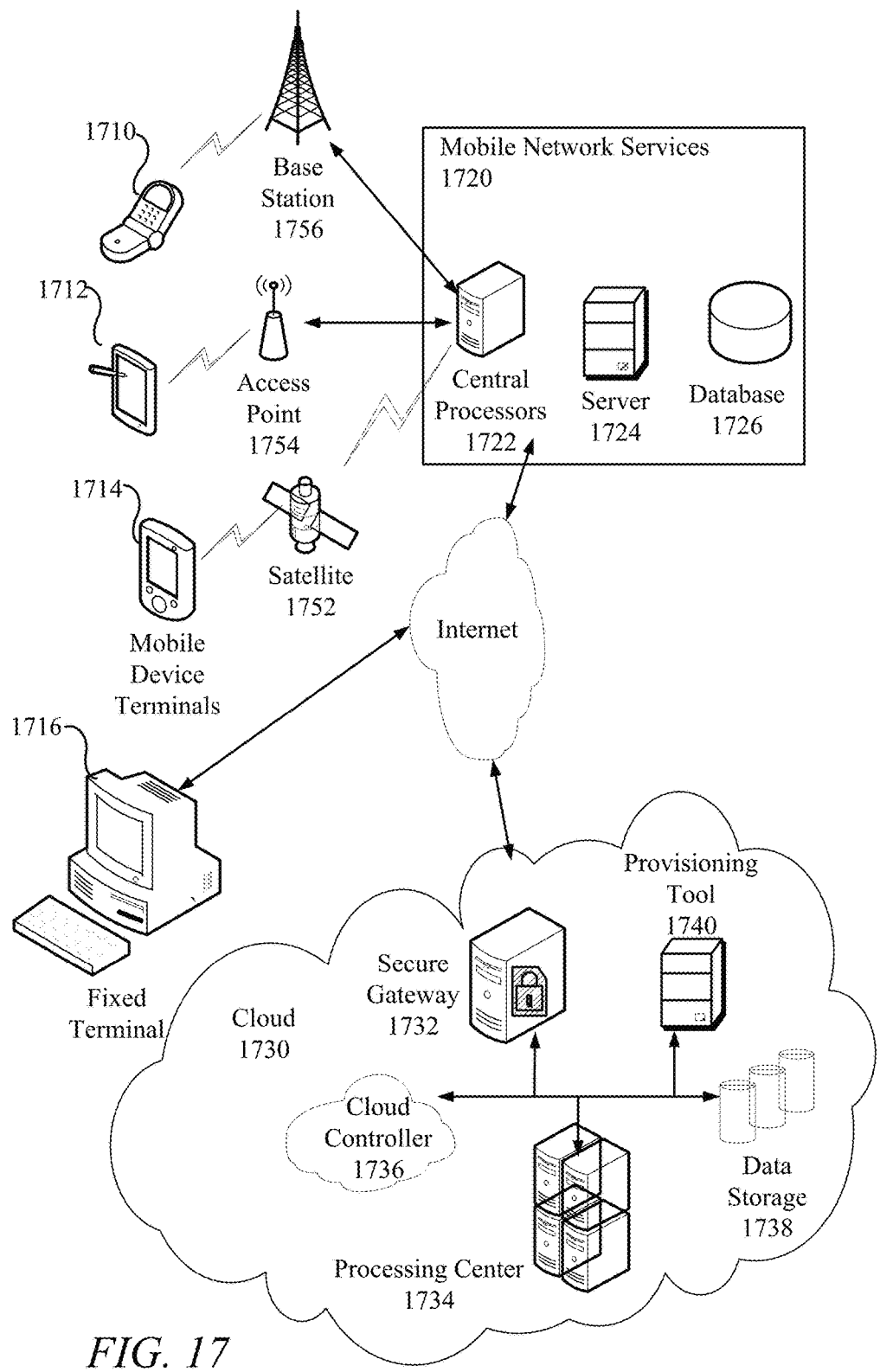
FIG. 17 is a schematic of a cloud computing system of an exemplary embodiment of the WSN.

FIG. 17 illustrates an exemplary cloud computing system, wherein users access the cloud through mobile device terminals or fixed terminals that are connected to the Internet.

The mobile device terminals can include a cell phone 1710, a tablet computer 1712, and a smartphone 1714, for example. The mobile device terminals can connect to a mobile network service 1720 through a wireless channel such as a base station 1756 (e.g., an Edge, 3G, 4G, or LTE Network), an access point 1754 (e.g., a femto cell or WiFi network), or a satellite connection 1752. In one implementation, signals from the wireless interface to the mobile device terminals (e.g., the base station 1756, the access point 1754, and the satellite connection 1752) are transmitted to a mobile network service 1720, such as an EnodeB and radio network controller, UMTS, or HSDPA/HSUPA. Mobile users' requests and information are transmitted to central processors 1722 that are connected to servers 1724 to provide mobile network services, for example. Further, mobile network operators can provide service to mobile users for authentication, authorization, and accounting based on home agent and subscribers' data stored in databases 1726, for example. The subscribers' requests are subsequently delivered to a cloud 1730 through the Internet.

A user can also access the cloud through a fixed terminal 1716, such as a desktop or laptop computer or workstation that is connected to the Internet via a wired network connection or a wireless network connection. The mobile network service 1720 can be a public or a private network such as an LAN or WAN network. The mobile network service 1720 can be wireless such as a cellular network including EDGE, 3G and 4G wireless cellular systems. The wireless mobile network service 1720 can also be Wi-Fi, Bluetooth, or any other wireless form of communication that is known.

The user's terminal, such as a mobile user terminal and a fixed user terminal, provides a mechanism to connect via the Internet to the cloud 1730 and to receive output from the cloud 1730, which is communicated and displayed at the user's terminal. In the cloud 1730, a cloud controller 1736 processes the request to provide users with the corresponding cloud services. These services are provided using the concepts of utility computing, virtualization, and service-oriented architecture.

In one implementation, the cloud 1730 is accessed via a user interface such as a secure gateway 1732. The secure gateway 1732 can for example, provide security policy enforcement points placed between cloud service consumers and cloud service providers to interject enterprise security policies as the cloud-based resources are accessed. Further, the secure gateway 1732 can consolidate multiple types of security policy enforcement, including for example, authentication, single sign-on, authorization, security token mapping, encryption, tokenization, logging, alerting, and API control. The cloud 1730 can provide to users, computational resources using a system of virtualization, wherein processing and memory requirements can be dynamically allocated and dispersed among a combination of processors and memories to create a virtual machine that is more efficient at utilizing available resources. Virtualization creates an appearance of using a single seamless computer, even though multiple computational resources and memories can be utilized according to increases or decreases in demand. In one implementation, virtualization is achieved using a provisioning tool 1740 that prepares and equips the cloud resources, such as the processing center 1734 and data storage 1738 to provide services to the users of the cloud 1730. The data center 1734 can be a computer cluster, a processing center, a main frame computer, or a server farm. In one implementation, the processing center 1734 and data storage 1738 are collocated.

Embodiments described herein can be implemented in conjunction with one or more of the devices described above with reference to FIGS. 16-17.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for placement of transmitting nodes of a wireless network, comprising:
    positioning a plurality of clusters of one or more transmitting nodes along a geometrically-linear path, each cluster of the plurality of clusters and each one of the one or more transmitting nodes of the plurality of clusters being aligned with the geometrically-linear path, wherein a distance between each cluster of the plurality of clusters is equal;

determining power consumption of a distal cluster of one or more transmitting nodes, positioned furthest from a proximal cluster of one or more transmitting nodes, wherein the power consumption of the distal cluster is based upon state variables of the one or more transmitting nodes;

determining a number of transmitting nodes in the distal cluster of one or more transmitting nodes based upon the power consumption of the distal cluster of one or more transmitting nodes, the number of transmitting nodes being determined to maximize lifetime;

determining power consumption of a subsequent cluster of one or more transmitting nodes, wherein the power consumption of the subsequent cluster of one or more transmitting nodes is based upon state variables of the one or more transmitting nodes; and determining a number of transmitting nodes in the subsequent cluster of one or more transmitting nodes based upon the determined power consumption of the subsequent cluster of one or more transmitting nodes, the number of transmitting nodes being determined to maximize lifetime, wherein lifetime is based upon initial capacity of a transmitting node battery, number of transmitting nodes in each cluster of the plurality of clusters, and power consumption of a head transmitting node of each cluster of the plurality of clusters.

2. The method of claim 1, further comprising assigning equal distances between the one or more transmitting nodes within each cluster of the plurality of clusters.

3. The method of claim 1, further comprising assigning each of the one or more transmitting nodes to one of the plurality of clusters, wherein each of the one or more transmitting nodes communicates only within an assigned cluster of the plurality of clusters.

4. The method of claim 1, further comprising selecting a first head transmitting node of each cluster of the plurality of clusters.

5. The method of claim 4, wherein the first head transmitting node of each of the plurality of clusters is configured to receive intra-cluster and inter-cluster transmissions and forward inter-cluster transmissions.

6. The method of claim 4, further comprising selecting a subsequent head transmitting node of each of the plurality of clusters, the subsequent head transmitting node selected when an energy level of the first head transmitting node reaches a predetermined level.

7. The method of claim 6, wherein the predetermined level of the energy level comprises a minimum energy level required for transmission.

8. The method of claim 1, wherein the distance between each cluster of the plurality of clusters is defined by a predetermined fidelity range, the fidelity range based upon a maximum transmission range and a minimum number of transmitting nodes required to achieve a predetermined level of fidelity.

9. The method of claim 1, wherein the number of transmitting nodes of a proximal cluster of the plurality of clusters is greater than or equal to the number of transmitting nodes of an adjacent, distal cluster of the plurality of clusters.

10. The method of claim 1, wherein the state variables of the transmitting nodes include energy capacity, transmission power, and transmission range.

11. The method of claim 1, wherein lifetime is expressed as $$LT_i = \frac{2 \times k_i \times E_{budget}}{P_T \times k(k-1) + P_R(k-1)(k-2) + 2f_i},$$

where $E_{budget}$ is the initial capacity of the transmitting node battery, k is the number of transmitting nodes of each cluster i, $P_T$ is transmission power, $P_R$ is receiving power, and $f_i$ is the power consumption of the head transmitting node of each cluster i.

12. The method of claim 1, wherein the number of transmitting nodes of each cluster of the plurality of clusters is bounded by an inequality expressed as $$\sqrt{\frac{1}{4} + \frac{2(P_R + f)}{(P_T + P_R)}} - \frac{1}{2} \leq k^* \leq \sqrt{\frac{1}{4} + \frac{2(P_R + f)}{(P_T + P_R)}} + \frac{1}{2},$$

where $k^*$ is the number of transmitting nodes of each cluster, $P_T$ is transmission power, $P_R$ is receiving power, and $f_i$ is the power consumption of the head transmitting node of each cluster.

13. A wireless network, comprising:
a plurality of clusters of one or more transmitting nodes positioned along a geometrically-linear path, each cluster of the plurality of clusters and each one of the one or more transmitting nodes of the plurality of clusters being aligned with the geometrically-linear path, wherein a number of transmitting nodes of a proximal cluster of the plurality of clusters is greater than or equal to a number of transmitting nodes of an adjacent, distal cluster of the plurality of clusters; and a base station connected to processing circuitry at a proximal end of the geometrically-linear path, the processing circuitry being configured to receive a transmission from the plurality of clusters, wherein the number of transmitting nodes of the adjacent, distal cluster of the plurality of clusters is based upon power consumption of the adjacent, distal cluster, the number of transmitting nodes of the adjacent, distal cluster being determined to maximize lifetime, the number of transmitting nodes of the proximal cluster of the plurality of clusters is based upon power consumption of the proximal cluster, the number of transmitting nodes of the proximal cluster being determined to maximize lifetime, and lifetime is based upon initial capacity of a transmitting node battery, number of transmitting nodes in each cluster of the plurality of clusters, and power consumption of a head transmitting node of each cluster of the plurality of clusters.

14. The wireless network of claim 13, further comprising a selected first head transmitting node of each cluster of the plurality of clusters, the first head transmitting node configured to receive intra-cluster and inter-cluster transmissions and forward intra-cluster and inter-cluster transmissions.

15. The wireless network of claim 14, further comprising a selected subsequent head transmitting node of each cluster of the plurality of clusters, the subsequent head transmitting node selected when an energy level of the first head transmitting node reaches a predetermined level.

16. The wireless network of claim 15, wherein the predetermined level of the energy level comprises a minimum energy level required for transmission.

17. The wireless network of claim 13, wherein the transmitting nodes within each cluster of the plurality of clusters are equally distributed.

18. The wireless network of claim 13, wherein the power consumption of the one or more transmitting nodes of each cluster of the plurality of clusters is based upon state variables of the transmitting nodes including energy capacity, transmission power, and transmission range.

19. The wireless network of claim 13, wherein the distance between each cluster of the plurality of clusters is defined by a predetermined fidelity range, the fidelity range based upon a maximum transmission range and a minimum number of transmitting nodes required to achieve a predetermined level of fidelity.

20. The wireless network of claim 13, wherein the one or more transmitting nodes of the plurality of clusters are positioned on a pipeline for fluid transportation, the pipeline for fluid transportation defining the geometrically-linear path.

\* \* \* \* \*